United States Patent Office 3,507,701
Patented Apr. 21, 1970

3,507,701
PROCESS OF USING FUEL CELL INCLUDING TUNGSTEN OXIDE CATALYST
Barret Broyde, New York, N.Y., assignor to Esso Research and Engineering Company, a corporation of Delaware
No Drawing. Filed Dec. 30, 1966, Ser. No. 606,021
Int. Cl. H01m 27/04, 13/00; B01k 3/06
U.S. Cl. 136—86     3 Claims

ABSTRACT OF THE DISCLOSURE

A method of producing electrical energy in a fuel cell. The cathode of the cell includes a non-metal catalyst consisting essentially of a non-stoichiometric tungsten oxide.

---

The present invention concerns non-noble metal electrocatalysts. In general, it relates to non-noble metal cathodic reduction catalysts for use in electrochemical cells. In particular, it concerns the use of certain tungsten oxides for the cathodic reduction of an oxidant in a fuel cell.

As used herein, the term "electrochemical cells" refers both to fuel cells and electrolytic cells.

The term "fuel cell" is used herein and in the art to denote a device, system or apparatus wherein the chemical energy of a fluid (i.e. gaseous or liquid) combustible fuel, e.g. hydrogen, carbon monoxide, a hydrocarbon or a substituted hydrocarbon containing hydrogen in its molecular structure, is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode, respectively, which are separated by an electrolyte which provides ionic conductance therebetween, conduction means for electrical connection between such anode and cathode external to such electrolyte, means for admitting a fluid fuel into contact with the anode and electrolyte and means for admitting a fluid oxidant into dual contact with the cathode and electrolyte. When necessary or desired, the electrolyte compartment is divided into an anolyte compartment and a catholyte compartment, e.g. by an ion-permeable partition or ion-exchange membrane. Thus, in each such fuel cell, a fluid fuel is passed to the anode and there oxidized electrochemically, giving up electrons to the anode, while a fluid oxidant is passed to the cathode and there reduced upon receiving electrons from such cathode. Since the voltage developed by an individual cell is low, it is usually preferable to employ relatively small cells and to electrically connect large numbers of such cells in series or in both series and parallel.

The term "electrolytic cell" is used herein and in the art to denote a device, system or apparatus which, unlike the aforementioned fuel cell, does not provide a net production of electrical energy but does provide for the anodic oxidation of an organic fuel at the anode of the cell. In such cells a direct current of electrical energy from an external source, e.g. a fuel cell, a storage battery or an alternating current rectifier, is admitted to the electrical circuit to provide an electron supply to the cathode. These cells evolve hydrogen from an aqueous electrolyte and water is added to the electrolyte while the cell is in operation. Such cells can be used for electrochemical production of various organic chemicals, e.g. conversion of alcohols to ketones, hydrocarbons to carboxylic acids, etc.

In most of the cells of the type hereinbefore described, catalysts are employed to promote the reactions within the cell. The term "cathodic reduction catalysts" is employed herein to include catalysts which are associated with the cathode reaction (as contrasted to the anode reaction), e.g. oxygen reduction, of an electrochemical cell. These catalysts usually are an integral part of the cathode but in some applications the catalysts are not a part of the cathode. For example, the catalysts may be employed in the form of an electrolyte slurry.

In addition to exhibiting cathodic reduction catalytic activity, a material to be suitable for use as such a catalyst in an electrochemical cell must also exhibit certain other properties. For example, the material must be electrically conductive and in addition must be resistant to attack from the electrolyte within the cell. Many cells employ acidic electrolytes, since such electrolytes reject carbon dioxide, and thus the material which is conductive and catalytic must also be resistant to acid corrosion in order for the material to be a suitable cathodic reduction catalyst.

It has now been unexpectedly discovered that tungsten oxides having the formula $WO_x$ $2<x<3$ are effective cathodic reduction catalysts. If $x$ is equal to or less than 2.0 the tungsten oxide is not sufficiently acid resistant. If $x$ is equal to or greater than 3.0 the tungsten oxide is not sufficiently electrically conductive. Thus, the present invention is concerned only with those tungsten oxides where $x$ in the above formula is greater than 2.0 and less than 3.0.

The methods used to prepare the tungsten oxides employed in the present invention are known and per se form no part of the present invention. For example, J. F. Marucco and P. Gerdanian, Compt. Rend. vol. 262C, p. 1037, 1966 describe the preparation of $WO_{2.72}$; Arne Magneli, Acta Cryst. vol. 6, p. 495, 1953 describes the preparation of $WO_{2.9}$; and Elizabeth Gebert and R. J. Ackermann, Inorganic Chemistry vol. 5, p. 136, 1966 describe the preparation of $WO_{2.96}$ and $WO_{2.98}$. Briefly the tungsten oxides can be prepared by mixing tungsten metal and tungsten trioxide. The relative amount of each compound which is present in the mixture is dictated by the stoichiometric formula desired. The mixture is pressed into pellets and heated under high temperatures and vacuum for several hours. The pellets are powdered, giving a catalytic powder.

The catalytic powder may be fabricated, for example, into a catalytic cathode by compressing the powder onto a conductive support material such as a metal screen with or without the use of a binder and/or wet-proofing agents such as Teflon.

The cathodic reduction catalysts of the present invention may be employed in electrochemical cells using acidic electrolytes such as sulfuric or phosphoric acids, buffer electrolytes such as aqueous or molten phosphates, borates, carbonates and the like. If used in alkali electrolytes the catalysts are attacked after a short period of time.

The cathodic reduction catalysts of the present invention may be employed for the cathodic reduction of any fluid oxidant such as oxygen, air and the like.

The present invention may be further illustrated by reference to the following example which is included for illustrative purposes only and is not intended to limit the scope of the invention in any respect.

EXAMPLE

A mixture of tungsten metal and tungsten trioxide having the stoichiometric composition $WO_{2.72}$ was heated in a sealed evacuated quartz tube. The tube was heated at 800° C. for three days and the blue product was ground to pass through a 200 mesh screen. This material was fabricated into a catalytic cathode on a 50 mesh tantalum screen at a catalyst loading of 200 mg./cm.² with Teflon emulsion. The cathode was tested in a half cell employing 30 wt. percent sulfuric acid at a temperature of about 85° C. The following data was obtained:

| Volts from theoretical hydrogen potential | Current (ma./5 cm.²) | °C. | Oxidant |
|---|---|---|---|
| 0.23 | −32 | 86 | $O_2$ |
| 0.23 | −0.23 | 86 | $N_2$ |
| 0.37 | −1.5 | 86 | $O_2$ |
| 0.37 | −.18 | 86 | $N_2$ |
| 0.43 | −.3 to −.4 | 86 | $O_2$ |
| 0.43 | −.07 | 86 | $N_2$ |

As mentioned above, the tungsten oxide cathodic reduction catalysts of the present invention may be fabricated in various manners to prepare catalytic cathodes. While the particular method of fabrication will to some degree effect the performance of the catalytic cathode, that aspect of the present invention which is concerned with catalytic cathodes is not limited to any particular method of cathode fabrication. Modifications of the present disclosure will be obvious to those skilled in the art. It is intended that the spirit of the present invention be limited only by the following claims.

What is claimed is:

1. In a method of producing electrical energy in a fuel cell containing an anode, a cathode including a catalyst, and an electrolyte positioned between and communicating with said anode and cathode, which comprises supplying a fuel to said anode and supplying an oxygen-containing oxidant to said cathode, the improvement wherein said catalyst is free of noble metals and consists essentially of a tungsten oxide having the formula $WO_x$ where $x$ is greater than 2 and less than 3.

2. In a method as defined by claim 1, the improvement where $x$ is about 2.72.

3. In a method as defined by claim 2, the improvement where $x$ is about 2.9.

References Cited

UNITED STATES PATENTS

| 409,365 | 8/1889 | Mond et al. | 136—86 |
| 3,134,697 | 5/1964 | Niedrach | 136—86 |
| 3,261,716 | 7/1966 | Roblee et al. | 136—86 |
| 3,416,967 | 12/1968 | White | 136—86 |

ALLEN B. CURTIS, Primary Examiner

U.S. Cl. X.R.

23—51; 136—120; 204—291

PO-1050
(5/69)

UNITED STATES PATENT OFFICE
CERTIFICATE OF CORRECTION

Patent No. 3,507,701　　　　　　　Dated April 21, 1970

Inventor(s) Barret Broyde

It is certified that error appears in the above-identified patent and that said Letters Patent are hereby corrected as shown below:

Column 4, under the heading, "UNITED STATES PATENTS", add the following references:

| | | | |
|---|---|---|---|
| 3,284,332 | 11/1966 | Gladrow et al | |
| 3,393,100 | 7/1968 | Niedrach | 136-86 |
| 3,410,731 | 11/1968 | Rightmire et al | 136-20 xr |

SIGNED AND SEALED

FEB 23 1971

FEB 23, 1971

(SEAL)
Attest:

Edward M. Fletcher, Jr.
Attesting Officer

WILLIAM E. SCHUYLER, JR.
Commissioner of Patents